Figure 1:
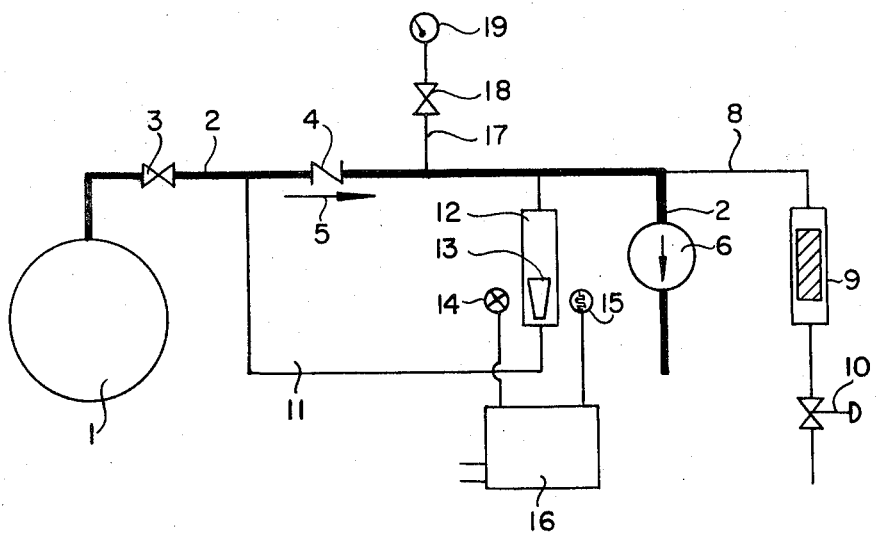

United States Patent [19]

Lindeberg

[11] 3,818,752

[45] June 25, 1974

[54] METHOD AND APPARATUS FOR TESTING TIGHTNESS

[76] Inventor: Nils G. Lindeberg, Kavallerivagen 4, 186 00 Vallentuna, Sweden

[22] Filed: Apr. 20, 1972

[21] Appl. No.: 245,937

[30] Foreign Application Priority Data
Apr. 28, 1971 Sweden.............................. 5509/71

[52] U.S. Cl..................................... 73/49.2, 73/52
[51] Int. Cl. ............................................ G01m 3/32
[58] Field of Search ................ 73/49.2, 49.3, 40, 52

[56] References Cited
UNITED STATES PATENTS

| 3,028,750 | 4/1962 | Rondeau | 73/49.2 |
| 3,031,884 | 5/1962 | Martin | 73/49.2 X |
| 3,100,392 | 8/1963 | Skinner | 73/46 |
| 3,151,478 | 10/1964 | Heldenbrand | 73/49.2 |
| 3,581,101 | 5/1971 | Neeff | 73/52 X |
| 3,691,821 | 9/1972 | Davey | 73/49.2 |

Primary Examiner—Richard C. Queisser
Assistant Examiner—Daniel M. Yasich
Attorney, Agent, or Firm—Larson, Taylor & Hinds

[57] ABSTRACT

Method and apparatus for testing the air tightness of an enclosed chamber. A reference pressure is established in a control section isolated from the chamber, after which the chamber and control section are placed in communication with each other, creating an initial flow through a flow restricting valve in the control section. After the pressure difference across this valve falls below a predetermined valve, any further flow that is sensed is indicative of a leak in the chamber.

15 Claims, 3 Drawing Figures

METHOD AND APPARATUS FOR TESTING TIGHTNESS

The present invention refers to a method and an apparatus for testing the tightness preferably of tanks, pipe-lines, cisterns, pressure vessels and the like, and the invention is directed to testing of tightness by means of so called zero-flow-measurement under pressure or subpressure, i.e., a tightness testing, in which the device to be tightness tested is subjected to a certain pressure or sub-pressure, whereupon any flow of air or other fluid into and out of the device to be tested is measured.

In prior methods for testing the tightness of for instance tanks all inlets and outlets of the tank are carefully closed, the tank is provided with a pressure meter, and water or any other pressure fluid is pumped into the tank. The tank is then allowed to stand during some time, usually from a couple of hours up to 24 hours, whereupon any fall of pressure in the tank is noted. Such a fall of pressure is thereby a indication about a present leakage.

This previously known method however involves some disadvantages. The method is extremely time consuming and it is very unexact since it is necessary to wait a long time before the reading of the manometer may take place, and there is therefore a risk that the result is influenced by variations in the air pressure and ambient temperature, etc.

A method analogus to the above described method is also previously known, whereby sub-pressure or vacuum is used instead of pressure in the device to be tested, and whereby a rise of pressure indicates a present leakage instead of the above-mentioned fall of pressure. This method however involves the same disadvantages as the above mentioned method. Further, in those cases it has shown to be difficult to obtain a quick and safe localizing of the location of leakage, and often it has been necessary to be content just to know that there is indeed a leakage.

Therefore there has been a demand for a method and an apparatus to enable a quick and safe testing of tightness by means of which it is possible to obtain the desired result within a few minutes and in which the result is obtained so quick that it cannot be influenced by variations in the ambient temperature or pressure, and in which the location of the leakage may quickly and easily be found. The present invention is intended to solve the problems and disadvantages in the prior methods and apparatus by providing a new and improved method and apparatus. Further characteristics of the invention will be evident in the following specification and claims.

Figure 2:
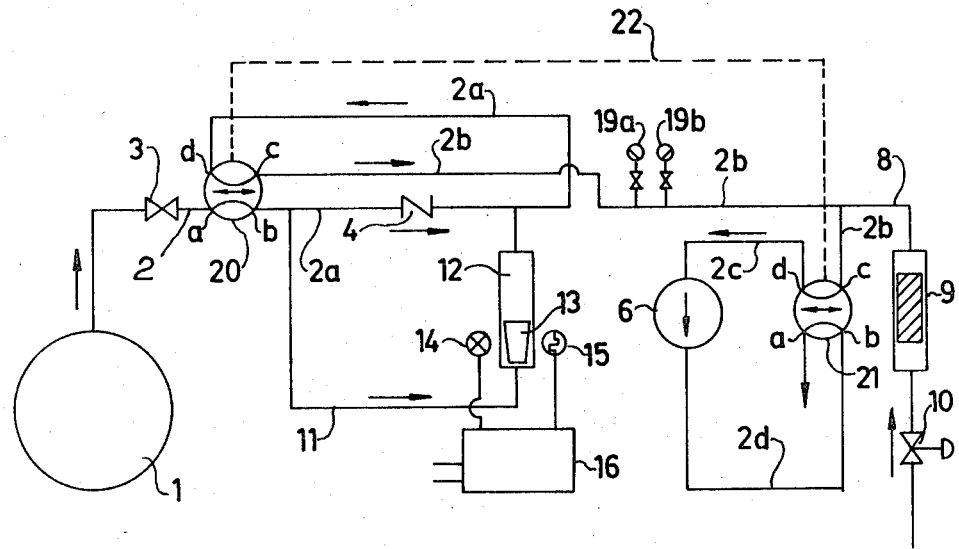
Figure 3:
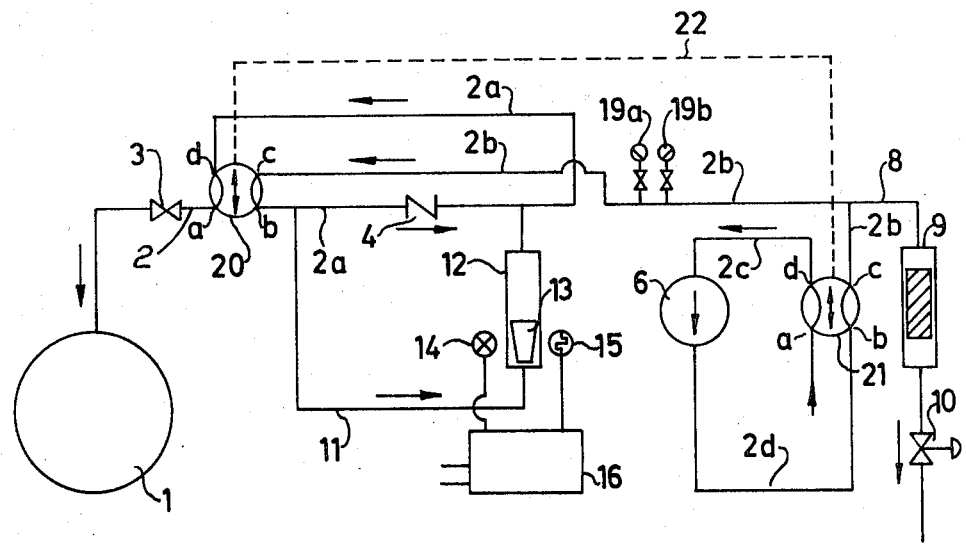

In the following description a number of embodiments of an apparatus according to the invention will be described with reference to the accompanying drawings in which FIG. 1 diagrammatically illustrates a simple apparatus according to the invention, FIG. 1 shows a modified embodiment of the testing apparatus according to FIG. 1, and FIG. 3 shows the testing apparatus according to FIG. 2 in the position for testing the tightness by means of pressure and/or for facilitating locating a leakage.

It is to be understood, however, that the embodiments of the testing apparatus which will be described below and which are shown in the drawings are only explanatory examples and that the invention is not limited to the said embodiments and that all kinds of variations may occur within the scope of the appended claims.

In the embodiment illustrated in FIG. 1 it is intended to temporarily or intermittently execute a testing of the tightness of a tank 1, which may for instance be an oil cistern which is either empty or completely or partly filled with oil or which may be a system of such cisterns with its associated conduits. It is presupposed that all outlets and inlets of the tank may be closed and that it is desired to obtain an indication of any leakage in the tank or any connection conduits or inlets and outlets thereof. The tank 1 is connected to a main conduit 2 for the testing apparatus, and between the testing apparatus and the tank there is a close valve 3. Following the close valve 3 the main conduit 2 is provided with a conventional check valve means in the form of a non-return valve 4 which will only permit a flow from the tank 1, i.e., in the direction of the arrow 5, which will be referred to as the flow direction of the valve and the main conduit 2 finally includes a vacuum pump 6 of high capacity. A number of branch conduits are connected to the main conduit as will be further explained below. The suction side of the vacuum pump 6 is connected to a branch conduit 8 which contains a flow indicator 9 followed by a pressure control valve 10.

The flow indicator 9 may be of any suitable kind, for instance of the type comprising a flow body having several colours and the rotation or turning of which gives an indication that there is a flow through the indicator. The pressure control valve 10 is of the conventional kind which may be regulated to any optional overpressure or under-pressure.

A branch conduit 11 of the main conduit 2 extends in parallel across the non-return valve 4, and the said branch conduit 11 includes a flow meter 12, for instance a flow meter of the type which is formed with a tube having a floating body displaceably received therein, which indicates a flow through the meter when displaced within the said meter tube and the displacement of which within the meter tube may also indicate the amount of air or liquid passing therethrough. The flow meter 12 should be sensitive enough to give a fully visible deflection even for an extremely small flow through the meter. If it is desired to have an exact indication of the magnitude of any leakage, two or more flow meters may be connected in parallel with each other, the various flow meters each having a different capacity, so that a careful reading of the total flow through the meters may be made. The flow meter 12 is connected into an electronic device for giving an alarm in case there is a flow through the flow meter which means that there is a leakage in the tank 1 or some part connected thereto. The electronic device may be of any suitable kind, but it is in the drawings showed to be a photo-cell watch having a bulb 14 which may light on a photo-cell 15 straight through the flow meter 12, and where the bulb 14 and the photo-cell 15 are connected to an electronic device 16 of the conventional kind, in which an alarm signal is obtained as soon as the floating body 13 is raised within the flow meter tube thereby closing the light beam from the bulb 14 to the photo-cell 15. The parallel fluid paths including the non-return valve 4 and the branch 11 with the flow meter 12 may be referred to as the control section of the system.

Between the non-return valve 4 and the connecting point of the branch conduit 11 to the main conduit 2 adjacent the vacuum pump 6 a further branch conduit 17 is connected to the main conduit 2, and this branch conduit 17 comprises a closing valve 18 and a pressure meter 19 for indicating the pressure in main conduit behind the non-return valve 4. The apparatus described above operates in the following manner: the main conduit 2 is connected stationarily or temporarily to the tank 1 and the close valve 3 is closed whereupon the vacuum pump 6 is operated. The vacuum pump should have a sufficiently high capacity that the apparatus may be used for testing various size tanks 1 under various pressure situations. In one actual form of execution of the invention the vacuum pump 6 has a sufficiently high capacity for testing with a pressure of 0.05 atom in the tank 1. Since the valve 3 is closed and since the branch conduits 11 and 17 are fluid tight the vacuum pump will act only over the branch conduit 8. The flow indicator 9 of the said branch conduit indicates if any flow exists in the conduit, i.e., if the pressure control valve 10 is open. The close valve 18 in the branch conduit 17 is opened, and the pressure in the conduit line may be read on the vacuum meter 19, and the sub-pressure is now regulated by means of the pressure control valve 10 to a predetermined amount which may be referred to as the reference pressure. As soon as an equilibrium state is reached the valve 3 of the main conduit 2 is opened, so that the pump 6 will subject the tank 1 to the said sub-pressure. While vacuum pumping the tank 1 the air or liquid coming from the tank flows both through the main conduit 2 over the non-return valve 4 and through the branch conduit 11 over the flow meter 12 and via the pump out into the ambient atmosphere. The flow meter 12 is of small capacity while the main conduit 2 and the non-return 4 are of great capacity so that most of the fluid will flow through the main conduit 2. The non-return valve 4 has as a purpose to restrict the flow so that the total flow volume at small flow rates will be by passed through the branch conduit 11 and over the flow meter 12. If desired, the non-return valve 4 may be formed with a return spring permitting only a comparatively large pressure drop over the non-return valve.

In a modified embodiment of the invention (not shown) the non-return valve 4, the branch conduit 11 and the flow meter 12 are formed as a double-acting unit having a common flow channel and a floating body located within a flow meter channel which may be conical or formed in any other way, whereby a measurement of very small flows is possible when the floating body is in the small size end of the conical passageway while large flows may pass through the flow meter when the flow meter body is in the large size end of the conical passageway.

Now that the whole of the apparatus is put under vacuum by the vacuum pump 6 the electronic device 16 is switched on and the bulb 14 is lit and will direct a light beam towards the photo-cell 15, but the said light beam will be interrupted by the floating body 13 which is in its lowermost position in the flow meter 12, whereby the electronic device 16 is blocked and there will be no alarm signal indicating a leakage. Provided the tank 1 is fluid tight the pump 6 will only act over the branch conduit 8 with the flow indicator 9 and the pressure control valve 10 and there will be no flow in the branch conduit 11 and the flow meter 12. Since there is consequently no flow through the said meter 12 the floating body 13 thereof will rest at the bottom of the tube through which the light beam from the bulb 14 is directed. As long as the light beam from the bulb 14 to the photo-cell 15 is interrupted by the floating body 13, the electronic device 16 is blocked, and there will be no signal of leakage. Because of the large capacity of the vacuum pump 6, the pressure in both the conduit 2 and the tank 1 will very quickly be reduced to vacuum and an equilibrium state of sub-pressure will be reached within a few seconds. If no signal is obtained thereafter due to the fact that the floating body 13 is in its bottom position (zero flow) cutting off the light beam from the bulb 14 to the photo-cell 15 a safe indication has been obtained that the tank 11 is tight, and the testing may be terminated. A complete testing of this kind may be carried through within the course of some minute.

If, contrary to what has been described above, the tank 1 should be afflicted with some defect resulting in a leakage when the tank is put under vacuum by the pump 6, air or liquid will be sucked into the tank, and a corresponding amount of air or liquid will flow through the main conduit 2, pass the valve 3, pass through the branch conduit 11 and the flow meter 12 and will leave via the vacuum pump into the atmosphere. As soon as a flow exists in the flow meter 12 the floating body 13 will move upwards whereby the light beam from the bulb 14 will immediately hit the photo-cell 15 and at the same time an impulse is given to the electronic device 16 and a signal for instance in the form of sound or light will immediately be obtained thereby indicating the presence of a leakage. As already mentioned the flow meter 12 is of a very sensitive type and even an extremely small flow through the meter will raise the floating body 13 so that the light beam from the bulb 14 will hit the photo-cell 15 and activate a leakage alarm.

By observing how high in the flow meter 12 the floating body 13 extends in case of leakage, a fairly safe conclusion may be made about the size of the leakage.

In FIGS. 2 and 3 an apparatus is shown, which principally corresponds to the above described apparatus which is shown in FIG. 1, but the apparatus according to FIGS. 2 and 3 may be utilized both for testing the leakage by means of vacuum or pressure and for locating the leakage spot by means of pressure. In this apparatus both a pressure meter 19a for over pressure and a vacuum meter 19b for sub-pressure are connected to the main conduit 2 between the branch conduit 11 and the pump 6.

Further, two four-way valves 20 and 21 are connected to the main conduit 2 for enabling a reversing of the flow direction to the tank 1 in the main conduit and in the branch conduit 8 while keeping constant the flow direction in the control section, that is, in the branch conduit 11, through parts of the main conduit 2 including valve 4 and through the pump 6. One four-way valve 20 is connected between the close valve 3 and the closest connection point for the branch conduit 11 while the other four-way valve 21 is connected between the first four-way valve 20 and the pump 6. Both four-way valves are mounted on the same functional axles so that both valves are rotated at the same time. For the sake of clearness the two valves have been shown parted in the drawings while the connection as to the function thereof has been indicated with the dotted line 22.

The flow meter 12 and the non-return valve 4 are of the one-way type and it is therefore important that the flow direction through these devices is kept constant independently of the flow direction to or from the tank 1 and through the branch conduit 8. For this purpose the main conduit is parted into a number of branch conduits 2a, 2b, 2c and 2d and for facilitating the explanation of the connection of the said branch conduits the various connection points of the four-way valves have been designated a, b, c and d, whereby the connection points a and b are connected within the valve, as are the connection points c and d. The branch conduit 2a extends in parallel with the branch from the close valve 3 through points a and b of the four-way valve 20 over the non-return valve 4 and to point d of the valve 20. The branch conduit 2b in turn extends from point c of the valve 20 to point c of the valve 21, the branch conduit 2c from point d of valve 21 to the input of the pump 6, while finally the branch 2d extends from the output of the pump 6 to point b of the valve 21. Point a of the valve 21 is connected to an open conduit.

The described apparatus is intended both for testing the tightness of the tank 1 by means of vacuum or pressure and for facilitating locating any existing leakages by subjecting the tank 1 to over pressure. In FIG. 2 the former function is illustrated and in FIG. 3 the latter function is illustrated.

The apparatus operates in the following manner with the methods as shown in FIG. 2: the main conduit 2 is connected stationarily or temporarily to the tank 1 and the close valve 3 is closed. The four-way valves 20 and 21 are regulated as indicated in FIG. 2 whereby flow may exist through the valve 21 over the points a–b and c–d, respectively. Since the valve 3 is closed and the branch conduit 11 is tight the pump 6 will only act over the branch conduit 8. The flow indicator 9 in the said branch conduit 8 indicates if there is any flow in the conduit 8, i.e., if the pressure control valve 10 is open. By means of the vacuum meter 19b the sub-pressure is regulated in the main conduit 2 to a pre-determined level. As soon as an equilibrium state has been reached the valve 3 of the main conduit 2 is opened so that the pump will subject also the tank 1 to the said sub-pressure. While vacuum pumping the tank 1 the air or liquid coming from the said tank flows through the part 2a of the main conduit over the non-return valve 4 and also through the branch conduit 11 over the flow meter 12 and further through the four-way valve 20 over the point d–c, through the main conduit branch 2b, through the four-way valve 21 over the point c–d, through the main conduit branch 2c, the pump 6, the main conduit branch 2d and out through the four-way valve 21 over the point b–a. At the same time a flow exists also through the branch conduit 8 over the valve 10, the flow indicator 9 and out through the pump 6 and the four-way valve 21.

Now when the complete system has been put under vacuum by the pump 6 the electronic device 16 is switched on and the bulb 14 is lit and will emit a light beam in the direction towards the photo-cell 15. Provided that the system is tight this light beam is however cut off by the floating body 13 which is in its lowermost position in the flow meter 12, whereby the electronic device 16 is blocked so that no alarm signal of an existing leakage will be given. In case of a tight tank flow will only come into question through the branch conduit 8, the pump 6 and the four-way valve 21. Since there is consequently no flow through the flow meter 12 the floating body 13 thereof will be kept still at the bottom of the tube through which the light beam from the bulb 14 is directed. As long as the light beam between the bulb 14 and the photo-cell 15 is cut off by the floating body 13 the electronic device 16 is blocked. If, to the contrary, there should be a leakage point in the tank 1 air or liquid will be sucked into the tank through the leakage and a corresponding amount of air or liquid will flow though the main conduit 2 past the close valve 3, through the branch conduit 11 and the flow meter 12 and out into the atmosphere via the conduits 2a, 2b, 2c, the pump 6 and the conduit 2d. As soon as there is a flow in the flow meter 12 the floating body 13 will be raised, whereby the light beam from the bulb 14 will immediately hit the photo-cell 15, and concurrently therewith an impulse will be given to the electronic device 16 and a signal will immediately be received for instance in the form of sound or light thereby indicating the presence of a leakage. As mentioned previously the flow meter 12 is of an extremely sensitive type, and therefore even an extremely small flow through the flow meter will raise the floating body 13, so that the light beam from the bulb 14 will hit the photo-cell 15, and an alarm of leakage will be emitted. By reading how high in the flow meter 12 the body 13 will move in case of a leakage it is possible to obtain a fairly safe conclusion about the size of the leakage.

If an indication is obtained in this way that the tank 1 is untight it is desirable to locate the leakage as soon as possible, and this is done in the following way which is illustrated in FIG. 3 and this method corresponds to the method for testing tightness by means of pressure: the close valve 3 for the tank 1 is closed and the four-way valves 20 and 21 are turned 90° to a position which will allow a flow through points a–d and b–c of these valves. A suitable pressure is regulated by means of the pressure control valve 10 and the said pressure is read on the pressure meter 19a. In this connection it may be noticed, that no change of action of the pump 6 is needed, but the flow direction through the pump is kept unchanged. Then the close valve 3 is reopened and a flow is obtained in this case through the four-way valve 21 over the points a–d, through the pump 6, through the valve 21 over the points b–c, through the branch conduit 2d, over the four-way valve 20 at the points c–d, through the branch conduit 2a, over the four-way valve 20, points d–a and via the close valve 3 into the tank 1 which is thereby put under pressure. Concurrently with the flow over the non-return valve 4 a flow also exists over the flow meter 12 in the same direction as during the vacuum testing, i.e., so that the floating body 13 is kept raised as long as a flow of fluid is existing out through the tank 1. Like during the vacuum testing a flow will also exist through the branch conduit 8 but in this case in the opposite direction, that is, through the flow indicator 9 and out through the pressure control valve 10. Small leakages, which cause small flows, are quickly and easily observed since all small flows go only through the branch conduit 11 and the flow meter 12.

By now smearing the tank 1 with a soap solution or the like and indication may easily be obtained of where air or liquid is forced out of the tank and this method of locating any leakage is in particular suitable for composite systems where several leakage points may be present at the same time.

As soon as all leakage points have been stopped up the flow through the tank 1 is ceased and consequently also the flow through the branch conduit 11 and the flow meter 12 ceases, whereby the floating body 13 will once more get down to its lowermost position indicated in the drawings, in which position the light beam between the bulb 14 and the photo-cell 15 is cut off. Thereby the alarm signal will immediately discontinue. All of the following flow through the pump 6 will pass through the flow indicator 9 and the pressure control valve 10.

It should be noted, that if the above described testing of tightness by means of vacuum or pressure indicates that no leakage is present the latter described cycle of function whereby the tank 1 is subjected to over pressure need of course not be prosecuted.

What we claim is:

1. A method for testing the air tightness of an enclosed chamber such as a tank, reservoir, pipe or the like, comprising the steps of:

establishing a regulated reference pressure other than atmospheric pressure in a control section which is fluid isolated from the enclosed chamber and which includes a main conduit having a flow restricting valve openable in a flow direction only after a predetermined pressure drop thereacross and a flow meter connected in parallel across the flow restricting valve for sensing flow in said flow direction at a pressure drop across the meter smaller than said predetermined pressure drop, this establishing step including maintaining a continuous flow of fluid through at least part of the control section, placing the enclosed chamber and the control section into fluid communication with each other such that fluid flowing between the chamber and the control section initially flows in said flow direction through the flow restricting valve while the pressure drop across the flow restricting valve is greater than said predetermined pressure, after which the pressure drop across the flow restricting valve falls below the said predetermined pressure drop, whereupon the flow restricting valve closes, and sensing any further flow between the enclosed chamber and the control section across the flow meter, said further flow, if any, being indicative of a leak in the enclosed chamber.

2. A method according to claim 1, in which the main conduit inludes a close valve between the control section and the enclosed chamber, and wherein the enclosed chamber is isolated by closing the close valve while the reference pressure is being established in the control section, and the step of placing the control section and the enclosed chamber into fluid communication with each other includes opening the close valve.

3. A method according to claim 2, wherein maintaining continuous flow in the control section prior to placing the control section and the enclosed chamber into communication with each other includes connecting a pump to a branch conduit having a pressure control valve, and regulating the pressure control valve with the close valve closed so that the pump subjects the main conduit to the said reference pressure.

4. A method according to claim 1, wherein said reference pressure is subatmospheric, and said flow direction is from the enclosed chamber through the control section to a pump.

5. A method according to claim 4, and including, after testing for leakage, the step of pressurizing the enclosed chamber to locate the leaks therein, wherein said pressurizing of the enclosed chamber is obtained by reversing the flow direction through the opened close valve and the main conduit into the enclosed chamber while keeping a constant flow direction through the control section.

6. A method according to claim 5 including regulating the pressure control valve so as to give a suitable overpressure to the control section before the enclosed chamber is subjected to said overpressure for the purpose of locating the leakage.

7. An apparatus for testing the air tightness of an enclosed chamber such as a tank, reservoir, pipe or the like, comprising:

a control section which includes a main conduit having a flow restricting valve openable in a flow direction only after a predetermined pressure drop thereacross and a flow meter connected in parallel across the flow restricting valve, said flow meter including means for indicating leakage in the enclosed chamber by sensing flow in said flow direction at a pressure drop across the meter smaller than said predetermined pressure drop, one end of said main conduit connected to the enclosed chamber by an openable and closable close valve which fluid isolates the enclosed chamber from the control section when it is closed, the other end of the main conduit connected to a means for establishing a reference pressure in the control section for maintaining a continuous flow of fluid through at least part of the control section, the relative flow characteristics of the flow restricting valve and of the flow meter being such that when the close valve is opened to place the enclosed chamber and the control section into fluid communication with each other, fluid flowing between the chamber and the control section which is at a pressure greater than said predetermined pressure, initially opens the flow restricting valve and flow in said flow direction through the flow restricting valve, and after the pressure drop across the flow restricting valve falls below the said predetermined pressure drop the flow restricting valve closes and any further flow between the enclosed chamber and the control section across the flow meter is indicative of a leak in the enclosed chamber.

8. An apparatus according to claim 7, wherein the means for providing said reference pressure in the main conduit comprises a vacuum pump and including a branch conduit onto the suction side thereof including a flow indicator and on line therewith a pressure control valve for preregulating the pressure to be given by the vacuum pump to the enclosed chamber and for indicating a flow of idle flow air through the branch conduit.

9. An apparatus according to claim 7, wherein the flow-meter is interconnected with an electronic alarm system which includes means for indicating any present leakage in the enclosed chamber.

10. An apparatus according to claim 9, wherein the electronic alarm system comprises a photocell relay with a bulb emitting light rays and a photocell receiver positioned to receive such rays, and said photocell relay is so connected to the flow-meter and to the electronic alarm device that the alarm is activated as soon as a flow is present through the flow-meter.

11. An apparatus according to claim 7, wherein the fluid restricting valve is a one-way valve spring biased such that the valve opens upon a large pressure drop thereacross, while small flow amounts pass through the flow-meter.

12. An apparatus according to claim 7, including means for reversing the flow direction in the enclosed chamber for subjecting the interior of the enclosed chamber to an overpressure for facilitating locating leakages therein.

13. An apparatus according to claim 12, wherein the means for reversing the flow direction in the enclosed chamber comprises a system of valves which are so coupled that the flow direction through the control section and the pump is kept constant both during the vacuum testing and the subsequent pressure testing.

14. An apparatus according to claim 15, wherein the system of valves comprises two four-way valves which are connected to each other for movement together, and of which one valve is interconnected in the main conduit between the close valve and the adjacent connection point for the branch conduit with the flow-meter while the second valve is connected between the first valve and the pump.

15. An apparatus according to claim 14, wherein the main conduit is divided into four main conduit branches, in which the first main conduit branch forms a coil between two points of the first four-way valve and includes the fluid restricting valve means and the branch conduit, and in which the second main conduit branch forms a connection between the first four-way valve and the second four-way valve, the third main conduit branch forming a connection to the pump, and the fourth main conduit branch forming a connection between the pump and a connection point of the second four-way valve.

* * * * *

UNITED STATES PATENT OFFICE
CERTIFICATE OF CORRECTION

Patent No. 3,818,752                    Dated   June 25, 1974

Inventor(s)    Nils G. Lindeberg

It is certified that error appears in the above-identified patent and that said Letters Patent are hereby corrected as shown below:

In the Abstract of the Disclosure, in the eighth line thereof, after "predetermined" please delete "valve" and substitute therefor --value--.

Signed and sealed this 8th day of October 1974.

(SEAL)
Attest:

McCOY M. GIBSON JR.                C. MARSHALL DANN
Attesting Officer                  Commissioner of Patents